(12) United States Patent
Johnston et al.

(10) Patent No.: US 9,122,422 B2
(45) Date of Patent: Sep. 1, 2015

(54) REPRESENTING MODELS IN SYSTEMS DEVELOPMENT LIFECYCLE (SDLC) TOOLS USING A NETWORK OF INTERNET RESOURCES

(75) Inventors: Simon K. Johnston, Siler City, NC (US); Martin P. Nally, Laguna Beach, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1310 days.

(21) Appl. No.: 12/015,742

(22) Filed: Jan. 17, 2008

(65) Prior Publication Data

US 2009/0187573 A1 Jul. 23, 2009

(51) Int. Cl.
*G06F 9/44* (2006.01)

(52) U.S. Cl.
CPC ........................................ *G06F 8/10* (2013.01)

(58) Field of Classification Search
USPC .................... 707/999.001, 600, 609, 687, 769
See application file for complete search history.

(56) References Cited

U.S. PATENT DOCUMENTS

| | | | | |
|---|---|---|---|---|
| 6,424,979 B1 * | 7/2002 | Livingston et al. | ........... | 715/206 |
| 7,020,697 B1 * | 3/2006 | Goodman et al. | ............ | 709/223 |
| 7,181,731 B2 * | 2/2007 | Pace et al. | ..................... | 717/136 |
| 7,315,826 B1 * | 1/2008 | Guheen et al. | ..................... | 705/7 |
| 7,548,878 B2 * | 6/2009 | O'Halloran et al. | ............. | 705/28 |
| 7,853,643 B1 * | 12/2010 | Martinez et al. | .............. | 709/203 |
| 2001/0056386 A1 * | 12/2001 | O'Halloran et al. | ............ | 705/28 |
| 2006/0059253 A1 * | 3/2006 | Goodman et al. | ............ | 709/223 |
| 2006/0212408 A1 * | 9/2006 | Nuestro et al. | .................. | 705/74 |
| 2007/0156842 A1 * | 7/2007 | Vermeulen et al. | ........... | 709/217 |
| 2007/0192215 A1 * | 8/2007 | Taylor et al. | .................... | 705/28 |
| 2008/0086495 A1 * | 4/2008 | Kiziltunc et al. | ............. | 707/102 |
| 2008/0140760 A1 * | 6/2008 | Conner et al. | ................ | 709/201 |
| 2008/0162482 A1 * | 7/2008 | Ahern et al. | ...................... | 707/9 |
| 2008/0201338 A1 * | 8/2008 | Castro et al. | .................. | 707/100 |

* cited by examiner

*Primary Examiner* — Mariela Reyes
*Assistant Examiner* — Soheila Davanlou
(74) *Attorney, Agent, or Firm* — Patents on Demand P.A.; Brian K. Buchheit; Scott M. Garrett

(57) ABSTRACT

In the present solution, as set of SDLC resources can be established, where each is separately addressable through a unique URL and is able to be managed through a simple set of operations. For example, a set of RESTful operations (GET, POST, PUT, and DELETE) can be used for the operations. Database management technologies can be leveraged for storing and indexing resources, but the underlying database schema for the solution can operate on a resource level, which results in the resources being stored as-is. Thus, storage (even when database based) of resources for the solution can be considered an Internet server exposing a space of URL addressable objects. Because the solution leverages Internet technologies and standards, it is scalable, standards based, extensible, and traceable.

19 Claims, 7 Drawing Sheets

Approach 200

```
<?xml version="1.0" encoding="UTF-8"?>
<!--xtools2_universal_type_manager-->
<?com.ibm.xtools.emf.core.signature <signature
id="com.ibm.xtools.uml.msl.model" version="7.0.0"><feature description=""
name="com.ibm.xtools.ruml.feature" url="" version="7.0.0"/></signature>?>
<?com.ibm.xtools.emf.core.signature <signature
id="com.ibm.xtools.mmi.ui.signatures.diagram" version="7.0.0"><feature
description="" name="Rational Modeling Platform (com.ibm.xtools.rmp)" url=""
version="7.0.0"/></signature>?>
<uml:Model xmi:version="2.0" xmlns:xmi="http://www.omg.org/XMI" xmlns:ecore="
http://www.eclipse.org/emf/2002/Ecore" xmlns:uml="
http://www.eclipse.org/uml2/2.0.0/UML" xmi:id="_F4EioN_nEdu4_bON_yMPtQ"
name="UseCaseExample">
<eAnnotations xmi:id="_F4Eiod_nEdu4_bON_yMPtQ" source="uml2.diagrams"/>
<packageImport xmi:id="_F4EipN_nEdu4_bON_yMPtQ">
<importedPackage xmi:type="uml:Model"
href="pathmap://UML_LIBRARIES/UMLPrimitiveTypes.library.uml#_0"/>
</packageImport>
<packagedElement xmi:type="uml:UseCase" xmi:id="_H7WpAN_nEdu4_bON_yMPtQ"
name="CheckReorder">
<ownedBehavior xmi:type="uml:Activity" xmi:id="_QQg9IN_nEdu4_bON_yMPtQ"
name="CheckReorder">
<eAnnotations xmi:id="_QRGzAN_nEdu4_bON_yMPtQ" source="uml2.diagrams"/>
<eAnnotations xmi:id="_UWxn4N_nEdu4_bON_yMPtQ" source="
http://www.eclipse.org/uml2/2.0.0/UML">
<details xmi:id="_UWxn4d_nEdu4_bON_yMPtQ" key="process"/>
</eAnnotations>
</ownedBehavior>
</packagedElement>
<packagedElement xmi:type="uml:Actor" xmi:id="_LZhZAN_nEdu4_bON_yMPtQ"
name="Customer"/>
<packagedElement xmi:type="uml:Actor" xmi:id="_MSvgAN_nEdu4_bON_yMPtQ"
name="Bank"/>
<packagedElement xmi:type="uml:Actor" xmi:id="_NHpHsN_nEdu4_bON_yMPtQ"
name="Printer"/>
<profileApplication xmi:id="_F4Eipd_nEdu4_bON_yMPtQ">
<eAnnotations xmi:id="_F4Eipt_nEdu4_bON_yMPtQ" source="
http://www.eclipse.org/uml2/2.0.0/UML">
<references xmi:type="ecore:EPackage"
href="pathmap://UML_PROFILES/Standard.profile.uml#_yzU58YinEdqtvbnfB2L_5w"/>
</eAnnotations>
<appliedProfile href="pathmap://UML_PROFILES/Standard.profile.uml#_0"/>
</profileApplication>
<profileApplication xmi:id="_F4Eip9_nEdu4_bON_yMPtQ">
<eAnnotations xmi:id="_F4EiqN_nEdu4_bON_yMPtQ" source="
http://www.eclipse.org/uml2/2.0.0/UML">
<references xmi:type="ecore:EPackage"
href="pathmap://UML2_MSL_PROFILES/Default.epx#_IN8k8MmBEdqBcN1R6EvWUw?Default/
Default?"/>
</eAnnotations>
<appliedProfile
href="pathmap://UML2_MSL_PROFILES/Default.epx#_a_S3wNWLEdiy4IqP8whjFA?Default?
"/>
</profileApplication>
<profileApplication xmi:id="_F4Eiqd_nEdu4_bON_yMPtQ">
<eAnnotations xmi:id="_F4Eiqt_nEdu4_bON_yMPtQ" source="
http://www.eclipse.org/uml2/2.0.0/UML">
<references xmi:type="ecore:EPackage"
href="pathmap://UML2_MSL_PROFILES/Deployment.epx#_IrdAUMmBEdqBcN1R6EvWUw?Deploy
ment/Deployment?"/>
</eAnnotations>
<appliedProfile
href="pathmap://UML2_MSL_PROFILES/Deployment.epx#_vjbuwOvHEdiDX5bji0iVSA?Deployment?"/>
</profileApplication>
</uml:Model>
```

Code 1010

FIG. 10A (Prior Art)

```
                                                                        Code 1020
<?xml version="1.0" encoding="UTF-8"?>
<usecase:UseCase xmlns:usecase="http://schema.ibm.com/rbp/2006/UseCase"
name="CheckReorder">
<link rel="process" type="" alt="Check Reorder Process"
href="CheckReorder.process"/>
<relationship>
<actor alt="Customer" href="Customer.stakeholder"/>
<actor alt="Bank" href="Bank.stakeholder"/>
</relationship>
<relationship>
<actor alt="Printer" href="Printer.stakeholder"/>
<actor alt="Bank" href="Bank.stakeholder"/>
</relationship>
</usecase:UseCase>
```

FIG. 10B

```
                                                                        Code 1030
<?xml version="1.0" encoding="UTF-8"?>
<stakeholder:Stakeholder xmlns:stakeholder="
http://schema.ibm.com/rbp/2006/Stakeholder" name="Bank">
<description xmlns:dc="http://purl.org/dc/elements/1.1/">
<dc:creator>Simon Johnston</dc:creator>
<dc:title>The core stakeholder defining the bank itself .</dc:title>
<dc:description>This stakeholder represents the bank as a legal
organization.</dc:description>
<dc:date>2007-01-16</dc:date>
This is the description
</description>
<link rel="source" alt="Based Upon" href="
http://www.ibm.com/imodels/fss/bank.stakeholder"/>
<property name="core">True</property>
</stakeholder:Stakeholder>
```

FIG. 10C

REPRESENTING MODELS IN SYSTEMS DEVELOPMENT LIFECYCLE (SDLC) TOOLS USING A NETWORK OF INTERNET RESOURCES

BACKGROUND

1. Field of the Invention

The present invention relates to the field of software development tooling and, more particularly, to representing models in SDLC tools using a network of Internet resources.

2. Description of the Related Art

A Systems Development Life Cycle (SDLC) is a collection of process, methods, and tools used by various roles to develop an information system, including requirements, validation, training, and user ownership through investigation, analysis, design, implementation, and maintenance. Required artifacts in the SDLC can be modeled using a variety of software modeling tools and standards, such as the Systems Modeling Language (SysML), Integrated DEFinition (IDEF), Entity Relationship Diagrams (E/R), Unified Modeling Language (UML), processing modeling tools, and the like. Each of these tools manage a set of associated artifacts, where an artifact is a software construct that represents any logical or physical asset created or maintained through a SDLC. For descriptive purposes, a model is a type of artifact with a structured representation used by modeling tools.

SDLC tooling can be analyzed in terms of the following general requirements: scalability, interoperability, extensible model representations, and traceability within and between models. Scalability refers to an ability of a solution to support hundreds of thousands, if not millions, or artifacts in its repository without unreasonable measures being taken. Interoperability, which can be realized in a SDLC context through open APIs, ensures that users are not locked into a specific tooling provided by a repository vender, which can increase purchase and maintenance costs, can be limiting in terms of utilization of emerging technologies, and can result in other problems typical of a lock-in situation. An extensible model representation describes models in a manner that permits them to carry and utilize additional information, such as information contributed by an additional tool or end-user. Extensible tools should have an ability to validate added content. Traceability within and between models refers to an ability of an approach to satisfy user needs to express and understand relationships between models and other SDLC artifacts. Relationships can include peer relationships (e.g., a customer having multiple accounts for which particular SDLC artifacts relate), temporal relationships (e.g., an artifact was created from another artifact), and trace relationships (e.g., showing which SDLC artifacts are associated with which sets of requirements).

Conventional SDLC modeling tools manage artifacts using either a database storage approach or a file system and version control system approach, each of which has significant shortcomings. FIG. 1 (Prior Art) illustrates a conventional database storage approach 110 and a conventional model file approach 140 for storing and managing SDLC artifacts.

The database storage approach 110 provides tools that operate in a client-server configuration, where information is stored in tables 112, 114 of a server database 116. An underlying schema for artifacts is fixed in advance and tools read/write to specific tables in a shared database 116. Since approach 110 relies upon a database foundation, it is as scalable as the underlying database 116 upon which it is constructed. Similarly, API's used for approach 110 depend upon those of an underlying database. Extensibility and traceability of approach 110 can require a restructuring of underlying database structures, which can be expensive and time consuming. Additionally, many database implementations include proprietary codes and structural constraints, which can make user desired modifications difficult. Further, user interfaces built on top of a database can require changes as a database structure changes.

A file and version control system (VCS) approach 140 can create artifacts on the file systems of the user's machines, which results in artifacts being stored in a set of storage spaces 142-149. These storage spaces 142-149 can be "nested" by designating a set of spaces 142, usually geographically grouped at a location having a primary function related to the type of artifact being stored. Within any set of spaces 142, numerous sub-spaces 144, 146 can exist. Searching for a given artifact can require searching through all the storage spaces 142-149. This searching can be "optimized" by grouping different types of artifacts so that only a subset of the storage spaces need be searched for a given type of artifact, such as searching space 142. This "optimization" assumes that a user's search criteria matches criteria through which the artifacts are grouped. Sometimes, a complete index of files in spaces 142-149 is maintained by a set of one or more servers. Approach 140 generally scales poorly and performance degrades quickly as an overall artifact quantity increases. Approach 140 often uses proprietary code and APIs, with variable extensibility characteristics depending upon coding practices used to implement an instance of approach 140. Most conventional solutions following approach 140 have limited to no traceability within and between models.

SUMMARY OF THE INVENTION

The present invention discloses a solution for designating software resources as URL addressable objects. Software resources can include Systems Development Life Cycle (SDLC) artifacts. Relationships and linkages among the resources can be established using the URLs. Each individual resource can be defined using standard Web based languages, such as using XML or any other HTML based/derived language. Additionally, the resources can be stored in a manner that maintains their internal structure. That is, when stored in a database, each resource is able to be stored as is, without breaking down the internal structure into multiple tables or into a database schema where an atomic unit is less than the resource level. Servers for managing the various resources can be established, which accept Representational State Transfer (REST) based commands. Thus, operations against resources can occur in a stateless fashion, using a set of simple operations (e.g., GET, PUT, POST, and DELETE). The disclosed solution is able to leverage tools and technologies used for storing, searching, and manipulating Web documents, since each SDLC resource is considered a URL addressable object. Optionally, database technologies can be leveraged in the solution, which is able to maintain a separate set of indexes for managed resources, to optimize search times and performance.

The present invention can be implemented in accordance with numerous aspects consistent with the materials presented herein. One aspect of the present invention can include a repository server for managing a network of individual resources, each of which is associated with an information technology (IT) asset. The server can include a data store and a REST Application Program Interface (API). The data store can store a set of SDLC resources, each resource having a unique addressable Uniform Resource Identifier (URI) associated with it. Each of the SDLC resource can represent a physical or logical IT asset. Each resource can utilize a standardized markup language to specify asset details. The network of individual resources can be linked to other resources using messages conforming to at least one standard network messaging protocol. The REST API can be configured for submitting resource related requests to the data store. The REST API can receive and respond to an HTTP GET command, an HTTP PUT command, an HTTP POST command, and an HTTP DELETE command.

Another aspect of the present invention can include a software object representing a information technology asset from which models are able to be built. The software object can represent a physical or logical IT asset. The software object can also include an addressable URI and at least one additional attribute. The URI is uniquely associated with the asset. The attribute is used to specify a value for the represented asset. The software object is able to be linked to other software objects having unique URI addresses using HTTP based links.

Still another aspect of the present invention can include a method for specifying IT assets that includes storing and managing a set of SDLC artifacts as a network of individual resources. Each individual resource can have a unique and addressable URI associated with it. Each of the SDLC artifacts can represent a physical or logical information technology asset. Each resource can utilizes a standardized markup language to specify asset details, wherein said network of individual resources are linked to other resources using messages conforming to standard network messaging protocols.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 10A (Prior Art) shows a code example for representation of the use case of FIG. 9 using OMG's XML Metadata Interchange (XMI).

FIG. 10B shows a code example for representing a use case of FIG. 9 utilizing a network of resources approach.

FIG. 10C shows a code example for representing a resource of FIG. 9 utilizing a network of resources approach.

DETAILED DESCRIPTION OF THE INVENTION

Figure 2:
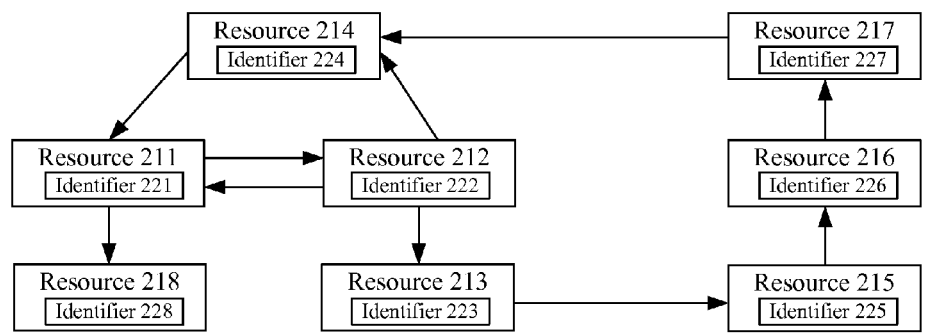
FIG. 2 is a schematic diagram illustrating using an approach for storing and managing SDLC artifacts as a network of individual resources in accordance with an embodiment of the inventive arrangements disclosed herein.

FIG. 2 is a schematic diagram illustrating using an approach 200 for storing and managing Systems Development Life Cycle (SDLC) artifacts as a network of individual resources in accordance with an embodiment of the inventive arrangements disclosed herein. As defined herein, a resource 211-218 can be a SDLC artifact that is managed according to Internet architecture principles. A SDLC artifact can be a software construct that represents any logical or physical asset created or maintain through a SDLC.

Each resource 211-218 can include a unique identifier 221-228, which can be an addressable Uniform Resource Identifier (URI). Each resource 211-218 can use standardized languages, such as extensible Markup Language (XML), a Hypertext Markup Language (HTML), or any other language markup based or otherwise, to specify asset details. Resources 211-218 can be linked 231-239 to other resources 211-218 using standard messages conforming to standard network messaging protocols. A set of resources 211-218 can be stored and managed within an open Internet repository of resources based upon Hypertext Transfer Protocol (HTTP) and Representational State Transfer (REST) principles.

In terms of scalability, approach 200 leverages the scalability model employed by the Internet today, which is almost endlessly scaleable. Each resource 211-218 is separately addressable and is managed through a simple set of operations. In one embodiment, database management technologies can be leveraged for storing and indexing resources 211-218. Unlike conventional database implementations, however, a database schema for the resources 211-218 is intended to store the resources 211-218 as-is rather than having specific tables established for different resource types and resource attributes. Thus, storage (even when database based) of resources 211-218 for approach 200 can be considered an Internet server exposing a space of URL addressable objects. Links between resources 211-218 are only of concern to the client navigating a network of resources 211-218.

In terms of using open Application Program Interfaces (APIs), approach 200 uses a REST style of HTTP usage, which is a foundational concept of the Internet architecture. Interactions with resources 211-218 can occur statelessly through a set of basic primitive commands, such as HTTP GET, HTTP POST, HTTP GET, and HTTP DELETE. REST commands able to be handled by many Web browsers. That is, most Web browsers can retrieve/review resources 211-218 directly without a need for specialized tooling. Additionally, any REST based tool can used for retrieving, adding, updating, and deleting resources 211-218, which makes API considerations for approach 200 a non-issue.

Unlike conventional approaches, which rarely permit SDLC artifacts to be extended with additional content, in approach 200, resource formats become part of the contract between servers and client tools. In other words, formats for SDLC can be standardized in any manner. A base standard can be established, by a standardizing organization such as the World Wide Web Consortium (W3C), for example, which can be extended at will. In one embodiment, resource 211-218 representations can be defined using XML and can specifically require namespace-aware processors such that extensions to resource formats can be defined in different XML namespaces and can therefore be mixed in to resources 211-218 in ways that do not affect the client processing of the resources 211-218.

In terms of traceability, the resources 211-218 are each treated as separate objects able to be linked to using URLs. This approach works by providing a very simple and extensible (REST messages) mechanism for both intra and inter resource links. In one embodiment, traceability relationships with resources 211-218 can be indexed so as to be able to produce resources to reverse queries. Traceability operations can be handled in the same manner as other linkages to the resources 211-218, even when traceability (or other) operations represent actions not known a priori by a resource designer. New functionality can even be added post deployment, so long as the standard conventions for URL referencing of the resources 211-218 are utilized.

It should be appreciated that the approach 200 is vastly different from conventional systems that either don't implement traceability capabilities or that implement them with separate and distinct tools. Use of separate tool can result in fragmentation of information and fragile links. Other conventional approaches attempt to define a single model that describes a set of concepts in a domain and the set of relationships among them. These approaches suffer from a "closed world view" where the model becomes hard to extend and is often too rigid to accommodate new concepts and operations.

Figure 3:
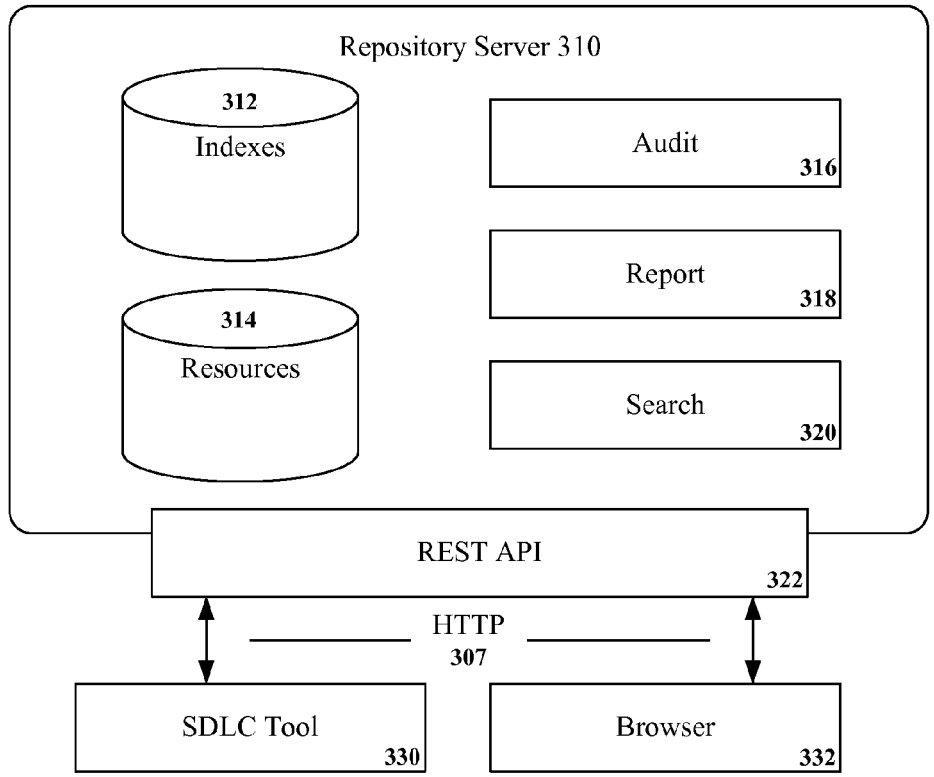
FIG. 3 is a schematic diagram of a system for managing/using a network of SDLC resource in accordance with an embodiment of the inventive arrangements disclosed herein.

FIG. 3 is a schematic diagram of a system 300 for managing/using a network of SDLC resource in accordance with an embodiment of the inventive arrangements disclosed herein. The resources 314 of system 300 can be structured and linked in a manner shown by approach 200. More specifically, system 300 describes one arrangement for managing a network of SDLC resources in a shared repository, which provides open and extensible access to the resources. System 300 also leverages open protocols and existing Internet practices to provide a scalable repository. It should be appreciated that system 300 represents one contemplated arrangement for managing/using SDLC resources and that the invention is not to be limited in this regard.

As shown in system 300, a repository server 300 can maintain a database of resources 314 that are currently being managed by the server 310. The resources 314 can be stored in a data store/database local to server 310, or can be stored in a more distributed fashion, where server 310 maintains a set of URLs for the "stored" resources, which are used to reference the resources regardless of their actual storage location. Server 310 can also maintain a set of indexes 312 for the resources 314, which permits queries to be executed against the resources 314. In one embodiment, the indexes 312 can be stored in a relational database so that standard queries can be efficiently executed against the indexes 312, such as SQL queries and commands.

The server 310 can include an auditing component 316, a reporting component 318, and/or a search component 320, each of which can utilize information stored in repository 312 and/or 314. The auditing component 316 can provide traceability capabilities for the resources, can show a change and usage history for the resource, and the like. Version control functions, such as check-in and check-out functions can also be performed/handled by auditing component 316. The reporting component 318 can permit any type of report involving the resources to be generated. Reports of component 318 can include SQL based reports, standard system provided reports, and user customized reports. Dynamic report generation and/or an ability to save and re-use previously created reports can be included in component 318. The search component 320 can permit cross-repository text searches and/or intra repository searches. Database and Web searching technologies can both be implemented within search component 320 to provide robust, extensible, and responsive search capabilities.

All the capabilities of server 310 can be accessed through REST API 322. That is, HTTP requests 307 (e.g., HTTP GET, HTTP POST, HTTP PUT, and HTTP DELETE) can be used to communicate with server 310. Server 310 communications can originate from a SDLC specific tool 330, from more generic tools, from any REST interface, and even from a standard (or enhanced) browser 332.

The server 310 can be any computing device or set of computing devices able to manage resources as described. In one embodiment, the server 310 can represent a physical server having installed software that executes locally. In another embodiment, the server 310 can also represent a virtual server or a distributed server, which is physically implemented by one or more hardware devices that may be distributed from each other. In still other embodiments, server 310 can further be implemented as a cluster of servers, or as a resilient set of servers linked in an autonomic manner. Use of REST standards and Internet protocols makes it easy implement functions of server 310 is a highly configurable and flexible manner.

The indexes 312 and resources 314 can each be data stores configured to maintain digitally encoded information. Each of the data stores can be physically implemented within any type of hardware including, but not limited to, a magnetic disk, an optical disk, a semiconductor memory, a digitally encoded plastic memory, a holographic memory, or any other recording medium. Each data stores can be a stand-alone storage unit as well as a storage unit formed from a plurality of physical devices. Additionally, information can be stored within each of the data stores in a variety of manners. For example, information can be stored within a database structure or can be stored within one or more files of a file storage system, where each file may or may not be indexed for information searching purposes. Further, each data store can utilize one or more encryption mechanisms to protect stored information from unauthorized access.

FIG. 4-7 illustrate message flows for implementing basic REST commands for SDLM resources. These basic commands can be to insert (HTTP POST), retrieve (HTTP GET), update (HTTP PUT), and delete (HTTP DELETE) SDLM resources that are stored as a network of resources in an Internet space. In one embodiment, the REST commands of FIG. 4-7 can be issued to a repository server (e.g., repository server 310) through a REST API (e.g., API 322). The repository server can include a resource storage element (e.g., resources data store 314 and search 320) and an indexer (e.g., indexes 312 and search 320). Although the examples of FIG. 4-7 show commands issuing from a SDLC tool (e.g., tool 330)

to a REST API of a repository server, commands from other sources (e.g., browser 332, for example) are contemplated. It should be appreciated that while FIG. 4-7 shows a sample implementation, derivatives are contemplated and that a scope of the invention is not to be limited in this regard.

Figure 4:
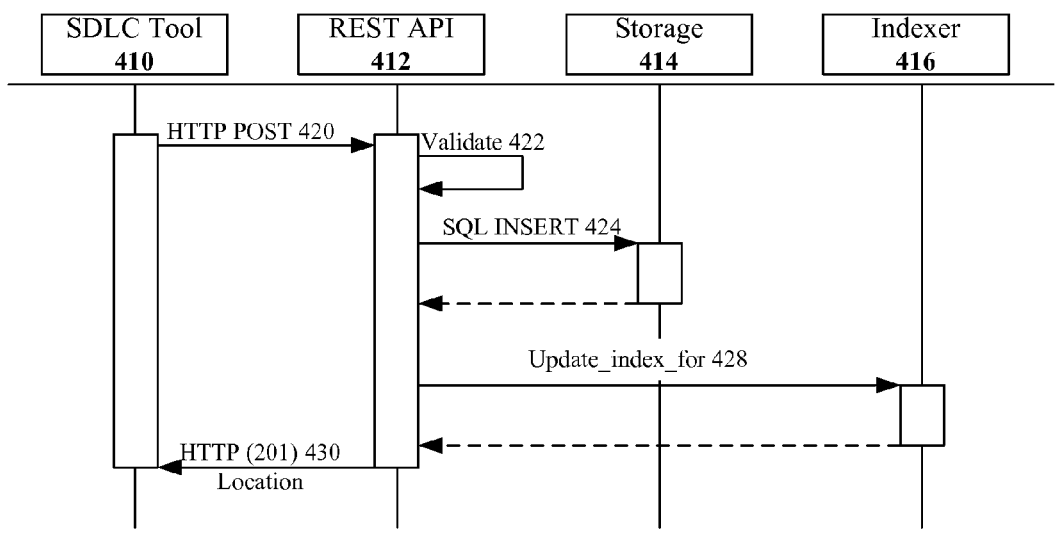
FIG. 4 is a flow diagram showing a method for creating a new SDLM resource in accordance with an embodiment of the inventive arrangements disclosed herein.

FIG. 4 is a flow diagram 400 showing a method for creating a new SDLM resource in accordance with an embodiment of the inventive arrangements disclosed herein. The diagram 400 can be applicable in context of any computing system using networked SDLM resources (as shown in diagram 200), such as system 300. Diagram 400 shows a SDLC tool 410, a REST API 412, a storage 414, and an indexer 416, which interact during the resource creation process.

In diagram 400, an HTTP POST command 420 can be sent from tool 410 to REST API 412, where the command 420 creates a new resource. The new resource can be validated 422, then inserted into storage 414 using a database insert command 424. A command 428 to update indexes associated with the new resource can be conveyed to an indexer 416. The indexer 416 can be a full text search engine, such as APACHE LUCENE. When the new resource is successfully created, a created response 430 (e.g., HTTP 201 code) can be returned to the SDLC tool 410. Otherwise, an appropriate error code can be returned to tool 410.

Figure 5:
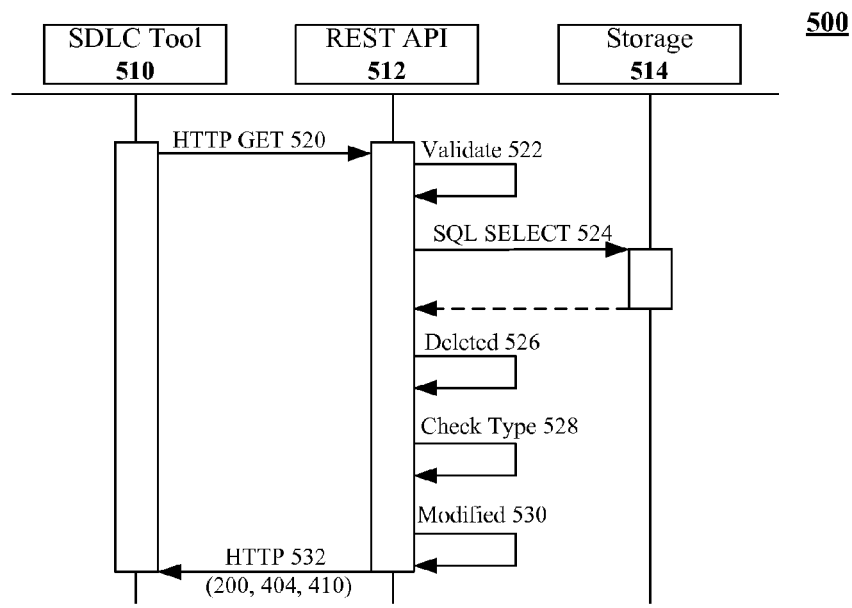
FIG. 5 is a flow diagram showing a method for retrieving an existing SDLM resource in accordance with an embodiment of the inventive arrangements disclosed herein.

FIG. 5 is a flow diagram 500 showing a method for retrieving an existing SDLM resource in accordance with an embodiment of the inventive arrangements disclosed herein. The diagram 500 can be applicable in context of any computing system using networked SDLM resources (i.e., as shown in diagram 200), such as system 300. Diagram 500 shows a SDLC tool 510, a REST API 512, and a storage 514.

In diagram 500, a HTTP GET command 520 can be sent from tool 510 to REST API 512, where the command 520 attempts to retrieve an existing resource. The request can be first validated 522. If valid, a retrieval request 524 can be sent to storage 514 for the resource. The request can, for example, be a database select query. A series of conditional actions can then occur based upon requests of the resource request to storage 514. If the requested resource is not found in storage 514, then a Not Found message 532 (e.g., HTTP 404 code) can be conveyed from REST API 512 to SDLC tool 510. The requested resource can be found in storage 514, but marked as deleted 526, in which case a Gone message 532 (e.g., HTTP 410 code) can be returned to tool 510. The requested resource can be of an incompatible type 528 compared to the stored resource format (determined based upon the Accepts request header, for example), in which case a Forbidden response 532 (e.g., HTTP 403 code) can be sent to tool 510. If the discovered resource has not been changed since the client last attempted to access it (determined using HTTP entity tags and conditional requests, for example) the server can return a Not Modified response 532 (e.g., HTTP 304 code) to tool 510. If everything succeed, a Success message 532 (e.g., HTTP 200 code) can be conveyed.

Figure 6:
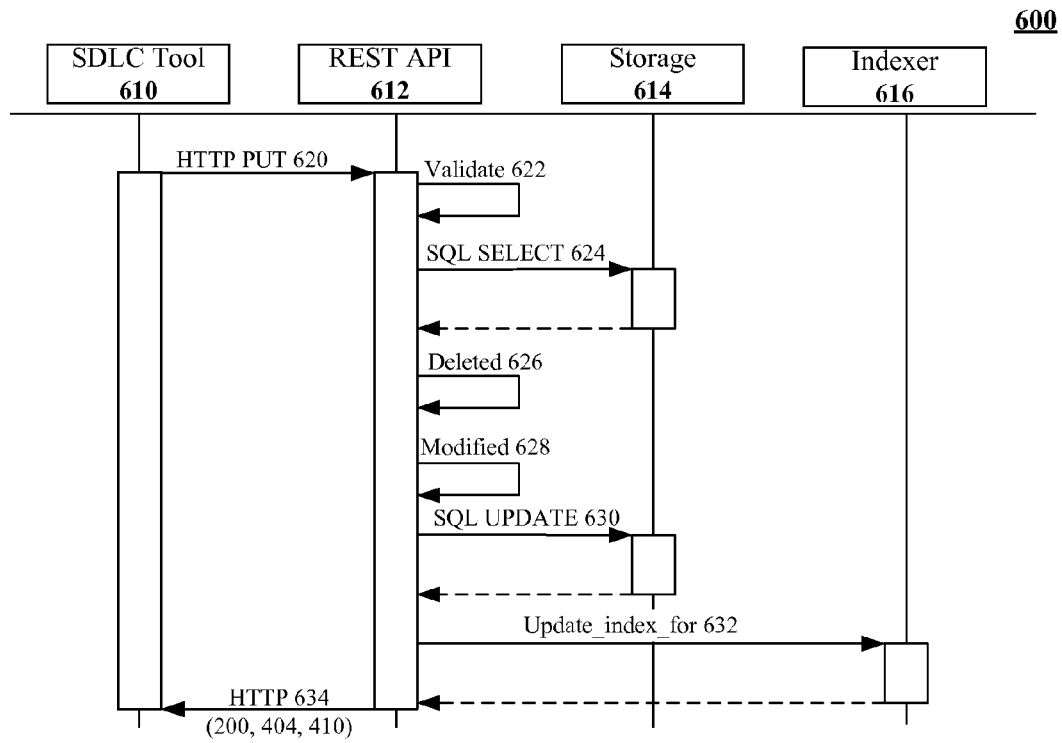
FIG. 6 is a flow diagram showing a method for updating an existing SDLM resource in accordance with an embodiment of the inventive arrangements disclosed herein.

FIG. 6 is a flow diagram 600 showing a method for updating an existing SDLM resource in accordance with an embodiment of the inventive arrangements disclosed herein. The diagram 600 can be applicable in context of any computing system using networked SDLM resources (i.e., as shown in diagram 200), such as system 300. Diagram 600 shows an SDLC tool 610, a REST API 612, a storage 614, and an indexer 616.

In diagram 600, a HTTP PUT command 620 can be sent from tool 610 to REST API 612, where the command is for updating an existing resource. The request can be validated 622, which is followed by a database query 624. The query 624 can be, for example, a SQL select command 624 from API 612 to storage 614 for finding the existing resource. If the requested resource is not found in storage 614, then a Not Found message 634 (e.g., HTTP 404 code) can be conveyed from REST API 612 to SDLC tool 610. The requested resource can be found in storage 614, but marked as deleted 626, in which case a Gone message 634 (e.g., HTTP 410 code) can be returned to tool 610. The requested resource can be of an incompatible type 628 compared to the stored resource format (determined based upon the Accepts request header, for example), in which case a Forbidden response 634 (e.g., HTTP 403 code) can be sent to tool 610. If the discovered resource has not been changed since the client last attempted to access it (determined using HTTP entity tags and conditional requests, for example) the server can return a Not Modified response 634 (e.g., HTTP 304 code) to tool 610. If everything succeeds, an update 630 SQL action can be performed. Indexes for the resource can then be updated via command 632, after which a Success indicator 634 can be sent to the tool 610.

Figure 7:
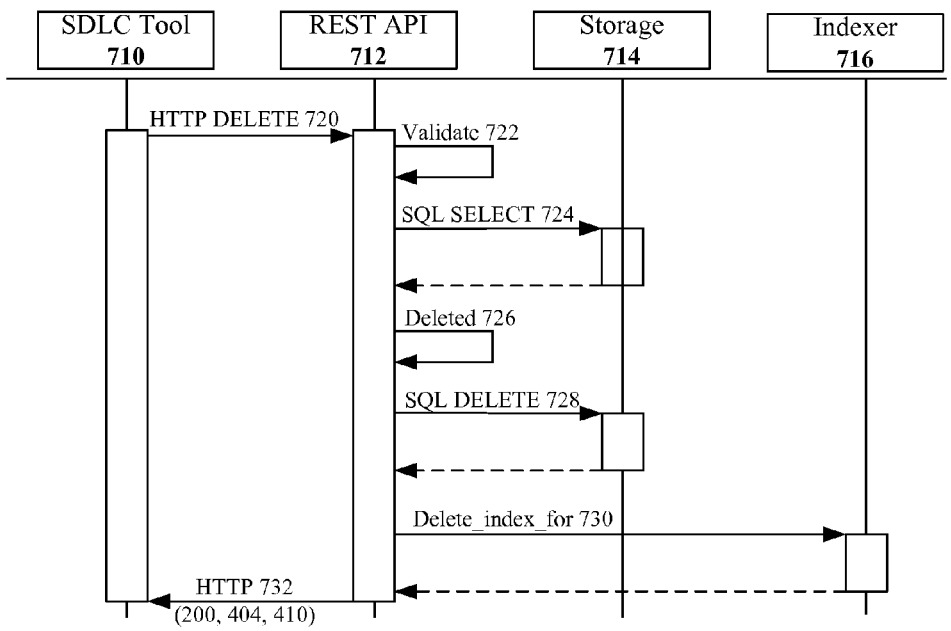
FIG. 7 is a flow diagram showing a method for deleting an existing SDLM resource in accordance with an embodiment of the inventive arrangements disclosed herein.

FIG. 7 is a flow diagram 700 showing a method for deleting an existing SDLM resource in accordance with an embodiment of the inventive arrangements disclosed herein. The diagram 700 can be applicable in context of any computing system using networked SDLM resources (i.e., as shown in diagram 200), such as system 300. Diagram 700 shows an SDLC tool 710, a REST API 712, a storage 714, and an indexer 716.

In diagram 700, a HTTP DELETE command 720 can be sent from tool 710 to API 712 to remove an existing resource from storage, the request can be validated 722, and the resource to be deleted can be searched 724 for in storage 714. Various checks (i.e., Not Found; Gone 726) can be performed to ensure the resource exists in storage 714. If so, a SQL delete 728 command can be issued to storage 714 to delete the resource and indexes 730 can be updated. A suitable response 732 depending upon whether the delete operation was successful can be sent to the SDLC tool 710.

Figure 8:
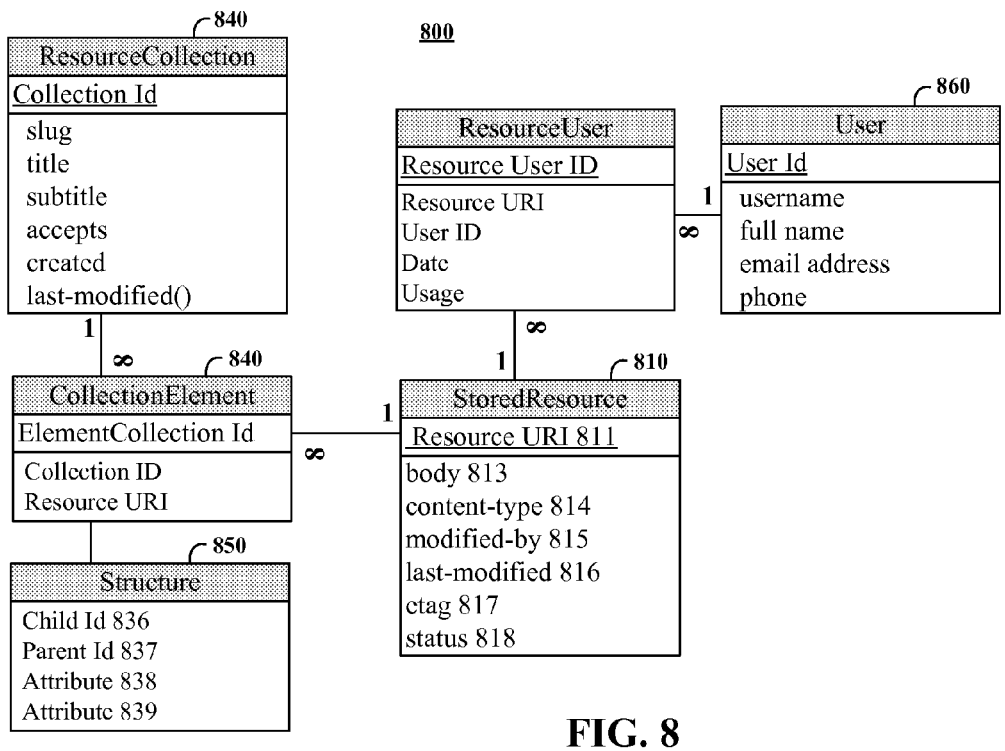
FIG. 8 is a diagram showing a database storage schema for storing SDLM resources as well as ancillary data, such as user records and collections of resources.

FIG. 8 is a diagram 800 showing a database storage schema for storing SDLM resources as well as ancillary data, such as user records and collections of resources. Diagram 800 can represent one contemplated database structure for resources data store 312 and/or for storage 414, 514, 614, 714. Storage structures other than what is shown in diagram 800 are contemplated and the invention is not to be limited in this regard.

The diagram 800 is expressed in approximately third normal form, as is standard for database schema representations. As shown, a many-to-many relationship can exist between resource collection table 840 and resource table 810, which are joined by resource collection associative table 830. This indicates that a resource can be part of many collections, and that each collection can include many resources. A many-to-many relationship also exists between the resources 810 and users 860, linked through resource user table 850. This indicates that resources can be accessed/updated/created/deleted by many different users and that users can manipulate many different resources.

As shown, each resource of table 810 can be uniquely identified by a URL 811, which serves as a primary key for table 810. Other attributes of table 810 can include a body 813, a content type 814, a modification id 185, a last modified value 816, an etag 817, a status 818, and the like. A set of table 810 attributes 814-818 can be tailored/optimized for the HTTP protocol, which allows for efficient protocol operations while provisioning for protocol specific capabilities, such as write-contention detection and deletion reporting. The body 813 of a resource is a stored software object not having a specific shape, type, or structure. Thus, structured XML files, word processor documents, image files, and the like can be equally well stored and managed by this schema.

In one contemplated derivation of schema 800, different types of resource body objects can be stored in different tables along with content type specific attributes, in which case the body 814 and content type 815 can together serve as a foreign key relating table 810 to these remote tables. This emphasizes that the schema of diagram 800 can be easily adapted by skilled database designers to handle an arbitrary level of complexity.

Resources of table 810 can be structured to create models, which can each be a collection definable by table 830 entries. Resource structure within a model can be indicated by attribute values of the resource collection associative table 830. For example, a structure level 832 can indicate a resource's position in a hieratical structure. When resources are able to be structured in a parent/child relationship, structural table 835 can be used to denote these relationships, where each child 836 and parent 837 element is a foreign key to an entry of the table 830. Different structural attributes 838, 839 can be included in structure table 835 to indicate structural characteristics important to the associated model. The schema of diagram 800 can be modified to include any number of structure defining tables and attributes. Thus, derivative schemas can be constructed to characterize any desired software model formed from structuring a set of resources.

Figure 1:
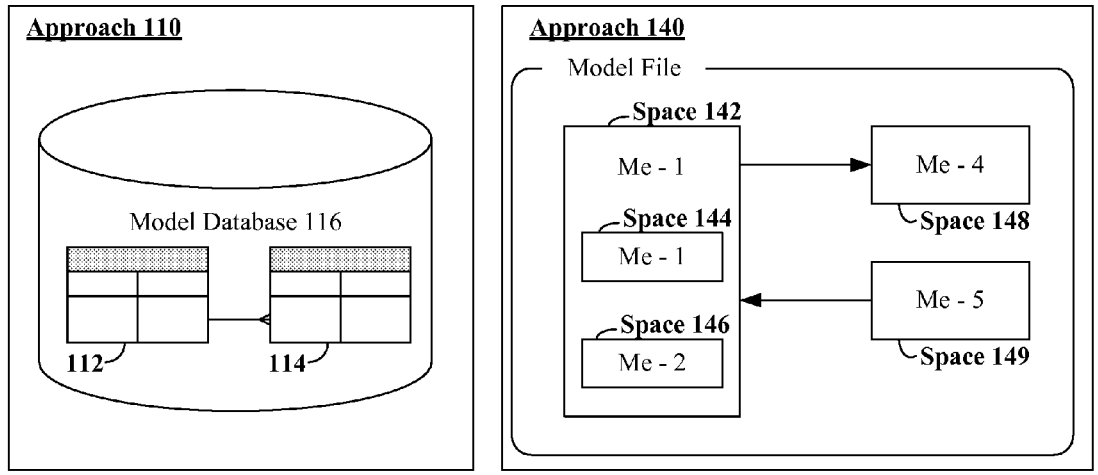
FIG. 1 (Prior Art) illustrates a conventional database storage approach and a conventional model file approach for storing and managing Systems Development Life Cycle (SDLC) artifacts.
Figure 9:
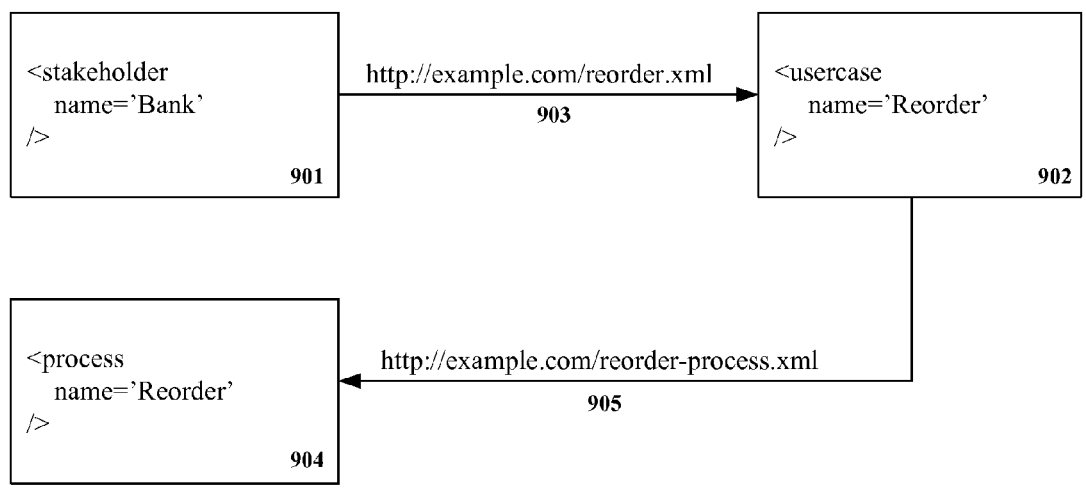
FIG. 9 represents a use case with a number of related actor elements in accordance with an embodiment of the inventive arrangements disclosed herein.

FIG. 9 represents a use case with a number of related actor elements in accordance with an embodiment of the inventive arrangements disclosed herein. The elements 901, 902, 904 can represent a stakeholder, a use case, and a process respectively. Communications among elements 901, 902, and 904 can be through a set 903, 905 of HTTP based messages. The use case of FIG. 9 is a generic and can be implemented using any of a number of approaches, such as approaches 110, 140, or 200 shown in FIG. 1-2.

Code 1010 of FIG. 10A (Prior Art) shows a representation of the use case of FIG. 9 using a commonly modeling format (e.g., OMG's XML Metadata Interchange (XMI)). FIG. 10A demonstrates a "closed world view" implemented by many conventional modeling tools. The assumption of code 1010 is that there is a root model element that contains everything needed for all SDLM artifacts. In code 1010, links within a model are separate and distinct from links to external resources, which are links that use proprietary URL formats. Also, tools associated with code 1010 do not expect arbitrary extension data to be included in the artifact, which limits their extensibility. Instead, the tools at best discard or ignore extension data. At worse, extension data can render a related artifact unusable. Code 1010 is an XMI representation of a UML model, and an associated tool can only permit extensions if they use standard UML extension capabilities, which SDLM tools for the model may or may not completely support depending upon how strictly they conform to UML standards.

Code 1020 of FIG. 10B and code 1030 of FIG. 10C conform to standards of approach 200, where every major concept is separated into its own resource type. So implementing the use case of FIG. 9 using concepts of approach 200 actors and processes are all individual resources, each having its own unique URL. Resources can be linked together using these URLs.

Code 1020 specifically represents the use case resource. It should be noted that links shown in code 1020 are relative links, which use whatever protocol and server/path that was used to retrieve the use case itself.

Code 1030 represents code for one of the actors referenced by the use case of FIG. 9. Code 1030 demonstrates a use of XML namespaces to mix in content that is not part of the core model, but that is defined by an external party (e.g., the creator, title, description, and data elements). Code 1030 also demonstrates a use of an absolute URL in referencing the stakeholder resource (of the use case of FIG. 9) upon which the resource associated with code 1030 is logically based.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for specifying IT assets comprising:
storing and managing a set of Systems Development Life Cycle (SDLC) artifacts as a network of individual resources stored on a resource level in an internet space, each individual resource having a unique and addressable Uniform Resource Identifier (URI) associated with it, wherein each of the SDLC artifacts represents at least one of a physical and logical information technology asset, wherein each individual resource has at least one attribute other than the URI that specifies a value for the represented asset, wherein each of the individual resources utilizes a standardized markup language to specify asset details, wherein the individual resources are linked to one another using messages conforming to at least one standard network messaging protocol; and
managing the SDLC artifacts through a repository server, comprising hardware and software, wherein communications to and from the repository server occur through a Representational State Transfer (REST) based Application Program Interface (API), wherein at least a portion of the SDLC artifacts are stored in the internet space within non-transitory storage devices remotely located from the repository server, wherein each SDLC artifact is a URI addressable object, wherein the repository server uses the URIs to reference the individual resources across the internet space regardless of the actual storage location of the individual resources, wherein the repository server maintains a set of indexes for the individual resources within a database, wherein URIs of the individual resources are used as unique keys within the database allowing the repository server to uniquely identify the individual resources, wherein the indexes permits queries directed to the set of SDLC artifacts to be effectively executed by the repository server responsive to requests from the messages received via the REST based API.

2. The method of claim 1, further comprising: managing the set of SDLC artifacts using a set of stateless Representational State Transfer (REST) based commands.

3. The method of claim 1, further comprising: establishing a repository local to the repository server comprising a plurality of said individual resources, wherein within the repository each of the individual resources is stored in a data store at a granularity unit level of one of said individual resources.

4. The method of claim 1, wherein said communications to and from the repository server occurring through the REST API include communications based upon an HTTP GET command, upon an HTTP POST command, upon an HTTP PUT command, and upon an HTTP DELETE command.

5. The method of claim 1, wherein the repository server provides version control functions including check-in and check-out functions for the SDL artifacts managed by the repository server.

6. The method of claim 1, wherein said repository server comprises:
an audit component configured to provide traceability capabilities for the of the SDLC artifacts managed by the repository server;
a report component configured to execute a set of SQL based reports of the SDLC artifacts managed by the repository server; and
a search component configured to permit cross-repository text searches for the of the SDLC artifacts managed by the repository server.

7. The method of claim 1, wherein the standardized markup language is an XML language, and wherein the standard network messaging protocol is a Hyper Text Transfer Protocol (HTTP).

8. The method of claim 1, wherein said step of claim 1 is performed by at least one machine in accordance with at least one computer program stored in a computer readable media, said computer programming having a plurality of code sections that are executable by the at least one machine.

9. A software artifact representing an information technology asset from which models are able to be built comprising:
a plurality of software artifacts stored on a resource level in an internet space, wherein said software artifacts together form a Software Development Lifecycle (SDLM) model, each of the plurality of software artifacts representing at least one of a physical and logical information technology asset, wherein each individual resource has at least one attribute other than the URI that specifies a value for the represented asset;
an addressable uniform resource identifier (URI) that is uniquely associated with said asset; and
at least one attribute used to specify a value for said represented asset, wherein said software artifact is able to be linked to other software artifacts having unique URI addresses using HTTP based links, wherein said software artifact is digitally encoded and stored in a non-transitory machine readable medium, wherein a repository server, comprising hardware and software, permits communications to and from the repository server occur through a Representational State Transfer (REST) based Application Program Interface (API), wherein at least a portion of the software artifacts are stored in the internet space within non-transitory storage devices remotely located from the repository server, wherein the repository server uses the URIs for the assets to reference the individual software artifacts across the internet space regardless of the actual storage location of the individual resources, wherein the repository server maintains a set of indexes for the individual resources within a database, wherein URIs of the individual resources are used as unique keys within the database allowing the repository server to uniquely identify the individual resources, wherein the indexes permits queries directed to the set of SDLC artifacts to be effectively executed by the repository server responsive to requests from the messages received via the REST based API.

10. The software artifact of claim 9, wherein said SDLM model, which is able to be built from the software artifacts is a Unified Modeling Language (UML) model.

11. The software artifact of claim 9, wherein the software artifact is written in XML.

12. The software artifact of claim 9, wherein a set of Representational State Transfer (REST) based commands exist for utilizing and modifying said software artifact.

13. The software object of claim 9, wherein said software artifact is able to be retrieved, viewed, edited, deleted, and added to a software model constructed from a set of said software artifacts via a Representational State Transfer (REST) based interface using a set of REST based commands.

14. The software artifact of claim 9, wherein the software artifact is part of a repository local to the repository server comprising a network of individual resources each of which is one of said software artifacts, wherein said repository is managed by the repository server, wherein each of the individual resources is stored in a data store at a granularity unit level of one of the individual resources.

15. A repository server for managing a network of individual resources, each of which is associated with an IT asset comprising:
a data store storing a plurality of Systems Development Life Cycle (SDLC) artifacts as a network of individual resources stored on a resource level in an internet space, each SDLC artifact having a unique addressable Uniform Resource Identifier (URI) associated with it, wherein each of the SDLC artifacts represents at least one of a physical and logical information technology asset, wherein each individual resource has at least one attribute other than the URI that specifies a value for the represented asset, wherein each of the SDLC artifacts is configured to utilize a standardized markup language to specify asset details, wherein said SDLC artifacts are linked to one another using messages conforming to at least one standard network messaging protocol;
a repository server, comprising hardware and software, that managing the SDLC artifacts, wherein communications to and from the repository server occur through a Representational State Transfer (REST) based Application Program Interface (API), wherein at least a portion of the SDLC artifacts are stored in the internet space within non-transitory storage devices remotely located from the repository server, wherein each SDLC artifact is a URI addressable object, wherein the repository server uses the URIs to reference the individual resources across the internet space regardless of the actual storage location of the individual resources, wherein the repository server maintains a set of indexes for the individual resources within a database, wherein URIs of the individual resources are used as unique keys within the database allowing the repository server to uniquely identify the individual resources, wherein the indexes permits queries directed to the set of SDLC artifacts to be effectively executed by the repository server responsive to requests from the messages received via the REST based API; and
the Representational State Transfer (REST API) for submitting SDLC artifact related requests to the data store, wherein said REST API is able to receive and respond to an HTTP GET command, an HTTP PUT command, an HTTP POST command, and an HTTP DELETE command.

16. The repository server of claim 15, further comprising:
an index data store comprising the set of indexes related to said SDLC artifacts, which permit database queries to be executed against the SDLC artifacts, wherein when the HTTP GET command is received a corresponding SQL SELECT query is executed against entries of the data store of SDLC artifacts, wherein when the HTTP POST command is received a corresponding SQL INSERT command is executed that results in a new artifact being added to the data store of the SDLC artifacts and that results in an update of the indexes of the index data store, wherein when the HTTP PUT command is received a corresponding SQL UPDATE command is executed against entries of the data store of the SDLC artifacts and that results in an update of the indexes of the index data store, wherein when the HTTP DELETE command is received a corresponding SQL DELETE query is executed against entries of the data store of the SDLC artifacts and that results in an set of indexes related to the deleted artifact being removed from the index data store.

17. The repository of claim 15, further comprising:
an audit component configured to provide traceability capabilities for the SDLC artifacts;
a report component configured to execute a set of SQL based reports involving the SDLC artifacts; and
a search component configured to permit cross-repository text searches for the SDLC artifacts.

18. The repository of claim 17, wherein the standardized markup language is an XML language, and wherein the standard network messaging protocol is a Hyper Text Transfer Protocol (HTTP).

19. The repository of claim 16, wherein said SDLC artifacts are able to be linked together to form a plurality of Software Development Lifecycle (SDLM) models, where said SDLM models comprise at least one Unified Modeling Language (UML) model.

\* \* \* \* \*